United States Patent [19]

Deller et al.

[11] Patent Number: 5,002,918

[45] Date of Patent: Mar. 26, 1991

[54] MOLDED ARTICLES BASED ON PYROGENICALLY PRODUCED MIXED-OXIDE SYSTEMS OF SILICON DIOXIDE AND ALUMINUM OXIDE, A METHOD FOR MANUFACTURING THEM AND THEIR USE

[75] Inventors: Klaus Deller, Hainburg; Rainhard Klingel, Alzenau; Helmfried Krause, Rodenbach; Klaus-P. Bauer, Doernigheim, all of Fed. Rep. of Germany

[73] Assignee: Degussa Aktiengesellschaft, Fed. Rep. of Germany

[21] Appl. No.: 488,382

[22] Filed: Feb. 23, 1990

Related U.S. Application Data

[63] Continuation of Ser. No. 308,122, Feb. 9, 1989, abandoned.

[30] Foreign Application Priority Data

Feb. 9, 1988 [DE] Fed. Rep. of Germany ....... 3803899

[51] Int. Cl.[5] ............................ B01J 21/12; B01J 21/16
[52] U.S. Cl. .................................... 502/263; 502/62; 502/63
[58] Field of Search ..................... 502/62, 63, 84, 407, 502/232, 263

[56] References Cited

U.S. PATENT DOCUMENTS 2,840,618  6/1958  Hecht ...................................... 502/84
3,957,685  5/1976  Heide et al. ........................... 502/84

FOREIGN PATENT DOCUMENTS 35905  3/1980  Japan ..................................... 502/84

Primary Examiner—Carl F. Dees
Attorney, Agent, or Firm—Beveridge, Degrandi & Weilacher

[57] ABSTRACT

A molded; i.e. pressed, article based on a pyrogenically produced system of mixed oxides of silicon dioxide and aluminum oxide and having the following physical-chemical features:

| | |
|---|---|
| pellet diameters | 2 to 15 mm |
| BET surface area according to DIN 66131 | 90 to 200 m$^2$/g |
| pore volume | 0.6 to 1.3 ml/g |
| pore size distribution | no pores with <5 nm diameters, at least 75% of the pores in the range of 5 to 40 nm |
| crushing strength | 30 to 120 N |
| composition | >75% by weight of SiO$_2$, remainder Al$_2$O$_3$ |

These molded articles are manufactured by homogenizing a pyrogenically produced system of mixed oxides of silicon dioxide and aluminum oxide with graphite and/or kaolin, urea, sugar, starch, glaze frit powder and/or microcrystalline wax while water is being added, by drying the mixture at a temperature between 80° and 120° C. and then comminuting it into a powder that next is pressed into molded articles and then is annealed for 0.5 to 6 h at a temperature between 400° and 1050° C. The molded articles are used as catalyst-supporters or as catalysts.

6 Claims, No Drawings

MOLDED ARTICLES BASED ON PYROGENICALLY PRODUCED MIXED-OXIDE SYSTEMS OF SILICON DIOXIDE AND ALUMINUM OXIDE, A METHOD FOR MANUFACTURING THEM AND THEIR USE

This application is a continuation of Ser. No. 308,122 filed Feb. 9, 1989 and now abandoned.

INTRODUCTION AND BACKGROUND

The present invention relates to molded articles based on pyrogenically produced mixed-oxide systems of silicon dioxide and aluminum oxide, the method for their manufacture and their use as catalyst-carriers or as catalysts.

Pyrogenically produced oxides are characterized by their extreme fine-particulate nature and their correspondingly high specific surfaces, their very high purities, spherical particle shapes and the lack of pores. On account of these properties, pyrogenically produced oxides are becoming increasingly significant as catalyst-carriers (D. Koth, H. Ferch, Chem. Ing. Techn. 52, 628 [1980]).

Pyrogenically produced oxides being especially fine-particulate in size, some difficulties are met with when these products are pelletized into catalyst-carriers or catalysts.

The German OLS No. 31 32 674 discloses a procedure for making molded articles using a silica sol as the binder.

Pressing pyrogenically titanium dioxide is known from the German OLS No. 32 17 751 using organic acids or acidically reacting salts as intermediary binders.

It is known from the German patent No. 21 00 778 to use granulates based on pyrogenically produced silicon dioxides as catalyst carriers in the preparation of products such as vinyl acetates.

These known procedures incur the drawback that the molded articles lack the desired optimal properties of crushing strength, pore volume and pore distribution for use in certain specific catalytic reactions, such as vinyl acetate manufacture from ethylene, acetic acid and oxygen or the hydration of ethylene into ethanol.

SUMMARY OF THE INVENTION

An object of the present invention is to provide molded articles based on a pyrogenically produced system of mixed oxides of silicon dioxide and aluminum oxide and having the following features:

| | |
|---|---|
| outside diameter | 2 to 15 mm |
| BET surface area according to DIN 66-131 | 90 to 200 $m^2/g$ |
| Total pore volume | 0.6 to 1.3 ml/g |
| Crushing strength | 30 to 120 N |
| pore size distribution | no pores of diameters <5 nm at least 80% of pores in the range of 5 to 40 nm diameter |
| composition | >75% by weight of $SiO_2$, remainder $Al_2O_3$. |

Another object of the invention is to provide a method for making molded articles based on a pyrogenically produced system of mixed oxides of silicon dioxide and aluminum oxide having the following physical-chemical features:

| | |
|---|---|
| outside diameter | 2 to 15 mm |
| BET surface area according to DIN 66 131 | 90 to 200 $m^2/g$ |
| Total pore volume | 0.6 to 1.3 ml/g |
| Crushing strength | 30 to 120 N |
| pore size distribution | no pores of diameters <5 nm at least 80% of pores in the range of 5 to 40 nm diameter |
| composition | >75% by weight of $SiO_2$, remainder $Al_2O_3$ | which is characterized by homogenizing a pyrogenically produced system mixed oxides of silicon dioxide and aluminum oxide with any of kaolin, graphite, sugar, starch, urea, glaze-frit powder, or microcrystalline wax, or a mixture thereof while water is being added. This resulting mixture is then dried at a temperature between 80 to 120° C. and comminuted into a powder. The resulting finely divided powder is pressed into molded articles that are annealed by heating for 0.5 to 6 hours at a temperature between 400 and 1050 °C.

In a special embodiment of the invention, the urea may be added to form the homogenized mixture in the form of an aqueous solution.

In principle any mixer apparatus or mill is suitable to carry out the invention that is capable of good homogenization of all ingredients. Thus for instance, paddle-fluidizing-, impeller- or airflow- mixers can be used for purposes of the invention. Those mixes are especially suitable that allow for subsequent compacting of the mixture, for instance plowshare mixers, pan-grinders and mullers or ball mills. Following homogenization of the mixture of ingredients, drying may be carried out at 80 to 120 C., so that after comminution, a friable or free flowing powder will be obtained. The molded articles may be made on punch presses, eccentric presses, extruders or revolving presses, or even by means of compactors.

In a preferred embodiment of the invention the mixture before being pressed exhibits the following composition:
  50–90, preferably 70–85% by weight of mixed oxides of $SiO_2$ - $Al_2O_3$
  0.1 to 8, preferably 1–5% by weight of kaolin, and/or
  0.1 to 10, preferably 1–5% by weight of graphite,
  0.1 to 10, preferably 1–5% by weight of wax,
  5 to 45, preferably 10–30% of urea.

In a particular embodiment of the invention, the mixture before pressing has the following composition:
  75 to 79% by weight of mixed oxides $SiO_2/Al_2O_3$,
  3 to 5% by weight of graphite,
  3 to 5% by weight of kaolin,
  13 to 17% by weight of urea.

The molded articles can have the most diverse shapes, for instance cylindrical, spherical, annealed, with an outside diameter of 2 to 15 mm.

The molded articles are annealed 30 minutes to 6 hours at 400–1050° C.

The crushing strength, the total surface and the total pore volume can be controlled within limits by varying the quantities of the input materials.

The molded articles of the invention can be used either directly as catalysts or as catalyst-carriers in that the moldings are impregnated during or after their manufacture with a solution of a catalytically active substance and, where called for, activated by suitable posttreatment. Catalytically active substances, such as the noble metal group, are well known in the art. Such compositions and methods of applying same to a carrier are well recognized in the industry.

In particular the molded; i.e. pressed, articles made of a mixed system of oxides of silicon dioxide and aluminum oxide are especially suitable as catalyst-carriers in the vinyl acetate synthesis from ethylene, acetic acid and oxygen, and as catalysts in the ethylene hydration procedure.

The molded articles of the invention offer the following advantages:
crushing strength,
high pore volume,
the predominant pore portion is in the meso-pore range,
there are no pores <5nm.

DETAILED DESCRIPTION OF THE INVENTION

EXAMPLES

The pyrogenically produced system of mixed oxides of silicon dioxide and aluminum oxide used in the invention have the following features:

|  | Aerosil MOX 170 | COK 84 |
| --- | --- | --- |
| BET surface area according to DIN 66 131 ($m^2/g$) | 170 ± 30 | 170 ± 30 |
| mean particle size (nm) | 15 | — |
| DIN 53 194 stamped density, Normal material (g/l) | about 50 | 50 |
| DIN 55 921 drying loss (2h, 105° C., %) | <1.5 | <1.5 |
| DIN 55 921 annealing loss (2h, 1000° C., %) relative to the material dried at 105° C. for 2h | <1 | <1 |
| DIN 53 200 pH value (in 4% aqueous dispersion) | 3.6–4.3 | 3.6–4.3 |
| $SiO_2$ relative to material annealed for 2h at 1000° C. in % | >98.3 | 82–86 |
| $Al_2O_3$ relative to material annealed for 2h at 1000° C. in % | 0.3–1.3 | 14–18 |
| $Fe_2O_3$ relative to material annealed for 2h at 1000° C. in % | <0.01 | <0.1 |
| $TiO_2$ relative to material annealed for 2h at 1000° C. in % | <0.03 | <0.03 |
| HCL relative to material annealed for 2h at 1000° C. in % (this HCl content is part annealing loss) | 0.025 | 0.1 |
| DIN 53 580 sieving residue (%) | <0.1 | <0.1 |

The BET surface is determined with nitrogen per DIN 66 131.

The pore volume is computed from the sum of the micro-, meso- and macro-pores.

Crushing strength is determined using a type TBH 28 tester from Ewerka Co.

The micro- and meso-pores are determined by recording an $N_2$ isotherm and evaluating it according to BET, de Boer & Barret, Joyner, Halenda.

The macropores are determined by the Hg penetration procedure.

EXAMPLE 1

77% by weight of Aerosil MOX 170,
4% by weight graphite,
4% by weight kaolin,
15% by weight urea
are homogenized with water in a Loedige mixer. The mixture so prepared is dried at 100°C. and then is forced through a 1 mm sieve. Pressing is carried out on a high speed rotary tablet machine (Fette Co.). The subsequent annealing is carried out for 2 h at 800° C.

The molded articles so produced possess the following physical-chemical features:

| pellet sizes | 5 mm diameter, 5.5 mm height |
| --- | --- |
| Crushing strength | 56 N |
| BET surface area | 154 $m^2/g$ |
| Total pore volume | 0.78 ml/g |
| composition | 96.5% by weight $SiO_2$, 3.5% by weight $Al_2O_3$ |
| pore size distribution | no pores with <5 nm diameter, 78% of the pores in the range of 5 to 40 nm diameter. |

EXAMPLE 2

77% Aerosil MOX 170,
4% kaolin,
4% graphite and
15% urea
are processed into molded articles in the manner of Example 1.

The produced molded articles exhibit the following features:

| pellet diameter | 6 mm |
| --- | --- |
| Crushing strength | 94 N |
| BET surface | 112 $m^2/g$ |
| Total pore volume | 0.90 ml/g |
| composition | 96.5% by weight $SiO_2$, 3.5% by weight $Al_2O_3$ |
| pore distribution | no pores size with <5 nm diameter, 77% of the pores in the range of 5 to 40 nm diameter. |

EXAMPLE 3

77% Aerosil MOX 170,
4% Degussa frit powder,
4% graphite, and
15% urea
are homogenized with addition of water and processed into extruded articles Annealing takes place at 800° C.

The produced molded articles exhibit the following physical-chemical features:

| pellet diameter | 3 mm |
| --- | --- |
| Crushing strength | 33 N |
| BET surface | 137 $m^2/g$ |
| Total pore volume | 0.86 ml/g |
| composition | 94% $SiO_2$, 5% frit |
| pore size distribution | no pores with <5 nm diameters, 80% of the pores in the range of 5 to 40 nm diameters. |

EXAMPLE 4

77% Aerosil MOX 170,
3.8% kaolin, and
19.2 % urea are homogenized as in Example 1 with water being added and are pelletized using the Korsch eccentric press.

Annealing takes place at 600° C.

The produced molded articles exhibit the following physical-chemical features:

| | |
|---|---|
| pellet diameter | 8.2 mm |
| Crushing strength | 69 N |
| BET surface | 162 m$^2$/g |
| Total pore volume | 1.2 ml/g |
| composition | 96% by weight SiO$_2$, 3.5% by weight Al$_2$O$_3$ |
| pore size distribution | no pores with <5 nm diameters, 76% of the pores in the range of 5 to 40 nm diameters. |

EXAMPLE 5

80% Aerosil MOX 170,
4% graphite, and
16% urea
are homogenized with addition of water in the manner of Example 1 and pelletized on the Korsch eccentric press.

Annealing takes place at 1000°C.

The molded articles exhibit the following physicla-chemical features:

| | |
|---|---|
| pellet diameter | 8.2 mm |
| Crushing strength | 59 N |
| BET surface | 150 m$^2$/g |
| Total pore volume | 1.08 ml/g |
| composition | 99% by weight SiO$_2$, 1% by weight Al$_2$O$_3$ |
| pore size distribution | no pores with <5 nm diameters, 75% of the pores in the range of 5 to 40 nm diameters. |

EXAMPLE 6

77% of Aerosil MOX 170,
3.5% of kaolin,
15.4% urea, and
3.8% of microcrystalline wax
are homogenized while water is being added in the manner of Example 1 and are pelletized on the Lorsch eccentric press.

Annealing takes place at 650° C.

The produced molded articles possess the following physical-chemical features:

| | |
|---|---|
| pellet diameter | 8.2 mm |
| Crushing strength | 88 N |
| BET surface | 154 m$^2$/g |
| Total pore volume | 0.96 ml/g |
| composition | 96.5% by weight SiO$_2$, 3.5% by weight Al$_2$O$_3$ |
| pore size distribution | no pores with <5 nm diameters, 76% of the pores in the range of 5 to 40 nm diameters. |

EXAMPLE 7

77% by weight of Aersoil COK 84,
4% by weight of graphite,
4% by weight of kaolin, and
15% by weight of urea
are homogenized with addition of water in the manner of Example 1 and are pressed into molded articles on an eccentric press.

Annealing takes place at 800° C.

The produced molded articles exhibit the following physical-chemical features:

| | |
|---|---|
| pellet diameter | 9 mm |
| Crushing strength | 76 N/pellet |
| BET surface | 152 m$^2$/g |
| Total pore volume | 0.82 ml/g |
| composition | 81% by weight SiO$_2$, 19% by weight Al$_2$O$_3$ |
| pore size distribution | no pores with <5 nm diameters, 98% of pores with >10 nm diameters. |

Further variations and modifications will be apparent to those skilled in the art and are intended to be encompassed by the claims appended hereto.

German priority application No. P 38 03 899.4-45 is relied on and incorporated herein.

We claim:

1. A molded article formed of pyrogenically produced mixed oxides of silicon dioxide and aluminum oxides, said molded article exhibiting the following features:

| | |
|---|---|
| outside diameter | 2 to 15 mm |
| BET surface area | 90 to 200 m$^2$/g |
| total pore volume | 0.6 to 1.3 ml/g |
| pore size distribution | no pores with <5 nm diameters, at least 80% of the pores in the range of 5 to 40 nm |
| crushing strength | 30 to 120 N |
| composition | >75% by weight of SiO$_2$, remainder Al$_2$O$_3$. |

2. A method for manufacturing a molded article of a pyrogenically produced mixed oxides of silicon dioxide and aluminum oxide and having the follwoing physical-chemical features:

| | |
|---|---|
| outside diameters | 2 to 15 mm |
| BET surface area | 90 to 200 m$^2$/g |
| total pore volume | 0.6 to 1.3 ml/g |
| pore size distribution | no pores with <5 nm diameters, at least 80% of the pores in the range of 5 to 40 nm |
| crushing strength | 30 to 120 N |
| composition | >75% by weight of SiO$_2$, remainder Al$_2$O$_3$ | consisting essentially of: mixing a pyrogenically produced mixture of oxides of silicon dioxide and aluminum oxide and homogenizing with kaolin, graphite, sugar, starch, urea, glaze frit powder, or microcrystalline wax or mixtures thereof in the presence of water, drying the resulting homogenized mixture at a temperature of 80 to 120° C. and then comminuting into a free flowing powder, pressing said powder into a molded article which then is annealed for 0.5 to 6 hours at a temperature between 400 and 1050° C.

3. A catalyst carrier comprising the molded article defined in claim 1 in the shape of pellet, rod, or annular shape.

4. A catalyst comprising the catalyst carrier of claim 3 having deposited thereon a catalytically active substance.

5. The method of claim 2 wherein the pyrogenically produced mixture of oxide of silicon dioxide and aluminum oxide has the following features:

| | |
|---|---|
| BET surface area (DIN 66 131) (m²/g) | 170 ± 30 |
| mean particle size (nm) | 15 nm |
| DIN 53 194 stamped density, Normal material (g/l) | about 50 |
| DIN 55 921 drying loss (2h, 105° C., %) | <1.5 |
| DIN 55 921 annealing loss (2h, 1000° C., %) relative to the material dried at 105° C. for 2h | <1 |
| DIN 53 200 pH value (in 4% aqueous dispersion) | 3.6–4.3 |
| SiO₂ relative to material annealed for 2h at 1000° C. in % | >98.3 |
| Al₂O₃ relative to material annealed for 2h at 1000° C. in % | 0.3–1.3 |
| Fe₂O₃ relative to material annealed for 2h at 1000° C. in % | <0.01 |
| TiO₂ relative to material annealed for 2h at 1000° C. in % | <0.03 |
| HCL relative to material annealed for 2h at 1000° C. in % (this HCl content is part annealing loss) | <0.025 |

6. The method of claim 2 wherein the pyrogenically produced mixture of oxide of silicon dioxide and aluminum oxide has the following features:

| | |
|---|---|
| BET surface area (DIN 66 131) (m²/g) | 170 ± 30 |
| DIN 53 194 stamped density, Normal material (g/l) | 50 |
| DIN 55 921 drying loss (2h, 105° C., %) | <1.5 |
| DIN 55 921 annealing loss (2h, 1000° C., %) relative to the material dried at 105° C. for 2h | <1 |
| DIN 53 200 pH value (in 4% aqueous dispersion) | 3.6–4.3 |
| SiO₂ relative to material annealed for 2h at 1000° C. in % | 82–86 |
| Al₂O₃ relative to material annealed for 2h at 1000° C. in % | 14–18 |
| Fe₂O₃ relative to material annealed for 2h at 1000° C. in % | <0.1 |
| TiO₂ relative to material annealed for 2h at 1000° C. in % | <0.03 |
| HCL relative to material annealed for 2h at 1000° C. in % (this HCl content is part annealing loss) | 0.1 |
| DIN 53 580 sieving residue (%) | <0.1. |

* * * * *